(12) United States Patent
Kronzer

(10) Patent No.: US 6,450,633 B1
(45) Date of Patent: *Sep. 17, 2002

(54) IMAGE-RECEPTIVE COATING

(75) Inventor: Francis Joseph Kronzer, Marietta, GA (US)

(73) Assignee: Kimberly-Clark Worldwide, Inc., Neenah, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 8 days.

(21) Appl. No.: 09/272,866

(22) Filed: Mar. 19, 1999

Related U.S. Application Data

(62) Division of application No. 08/910,706, filed on Aug. 13, 1997, now abandoned, which is a continuation of application No. 08/557,983, filed on Nov. 13, 1995, now abandoned.

(51) Int. Cl.[7] .................................................. B41M 5/00
(52) U.S. Cl. ..................... 347/105; 427/258; 427/288; 427/375; 427/391; 428/195; 428/206; 428/211; 428/327
(58) Field of Search ........................ 347/105; 428/195, 428/327, 206, 211; 427/258, 288, 375, 385.5, 391

(56) References Cited

U.S. PATENT DOCUMENTS

| | | | | |
|---|---|---|---|---|
| 4,610,919 A | | 9/1986 | Kent ........................... | 428/285 |
| 4,617,339 A | | 10/1986 | Rochell et al. ............. | 524/514 |
| 4,773,953 A | | 9/1988 | Hare .......................... | 156/240 |
| 5,242,739 A | | 9/1993 | Kronzer et al. ............. | 428/200 |
| 5,376,699 A | | 12/1994 | Sage ........................... | 523/206 |
| 5,958,168 A | * | 9/1999 | Liu et al. ..................... | 156/230 |
| 6,033,739 A | * | 3/2000 | Kronzer ...................... | 427/391 |

FOREIGN PATENT DOCUMENTS

| | | |
|---|---|---|
| EP | 0 587 164 | 3/1994 |
| GB | 2 189 436 | 10/1987 |
| JP | 4-265784 | 9/1992 |
| WO | 93/04869 | 3/1993 |

OTHER PUBLICATIONS

Abstract for Japanese 4–265784 dated Sep. 21, 1992.
"Solubility Parameter Method", Encyclopedia of Polymer Science and Engineering, vol. 15, 1989, pp. 393–395.
"Solubility Parameter Values", Polymer Handbook, 3rd Ed. 1989, pp. 519–557.

* cited by examiner

Primary Examiner—Bruce H. Hess
(74) Attorney, Agent, or Firm—James B. Robinson; Steven D. Flack

(57) ABSTRACT

A coating composition which includes from about 95 to about 50 percent by weight, based on the weight of the coating composition, of particles of a polymer having a solubility parameter of from about 19 to about 28 $(MPa)^{1/2}$ and particle sizes of from about 0.5 to about 50 micrometers. The coating composition also includes from about 5 to about 50 percent by weight, based on the weight of the coating composition, of a binder. The binder may be essentially any polymer which can be dispersed or dissolved in the coating vehicle or solvent. Convenient binders are polymeric lattices such as poly(vinyl acetate), acrylic lattices etc., amine-dispersed carboxylated polymers such as polyesters and ethylene-acrylic acid lattices, and the like. The coating composition also may include a surfactant. For example, the surfactant may be nonionic. Other ingredients also may be present. Examples of such other ingredients include, by way of illustration only, crosslinking agents, viscosity modifiers, and defoamers. Also provided is a substrate having a coating thereon of the coating composition just described. Examples of suitable substrates include, by way of example, only, fibers; fabrics, which may be woven or nonwoven; and papers. Additionally provided is a method of preparing a durable and washable ink jet printed image on a substrate, which method includes providing a substrate having a coating prepared from the coating composition described above, printing an image on the coated substrate with an ink jet printer, and thermally fusing the ink jet printed image to the coated substrate.

9 Claims, No Drawings

IMAGE-RECEPTIVE COATING

This application is a division of application Ser. No. 08/910,706 entitled "IMAGE-RECEPTIVE COATING" and filed in the U.S. Patent and Trademark Office on Aug. 13, 1997, now abandoned, which application is a continuation of application Ser. No. 08/557,983, which was filed Nov. 13, 1995, now abandoned. The entireties of both applications are hereby incorporated by reference.

BACKGROUND OF THE INVENTION

The present invention relates to a coating composition and to substrates coated therewith.

The decoration of fabrics composed mainly of synthetic polymer fibers such as polyester and nylon has been accomplished for many years via dye sublimation, also referred to as dye diffusion heat transfer techniques. These techniques involve printing an image on paper or other disposable substrate and then transferring the image from the paper to the fabric. Print patterns applied to paper by such printing techniques as offset lithography contain sublimable dyes. Such dyes have been tailored to dissolve in and be retained by the synthetic polymer fibers upon heating. The print patterns are readily transferred to the fabrics by heating the paper and pressing it onto the fabric for a few seconds, typically in a heated press.

Although it is highly desirable, it has not been possible to date to use the above dye transfer techniques successfully to decorate infusible fibers such as cotton and rayon. Generally, screen printing is used to apply complex patterns directly to such fabrics. This technique works well, but is not economical for making a small number of garments (usually less than about 50) having the same pattern, since screen fabrication is quite expensive. Thus, it would be very useful if it were possible to use digital printing technology to decorate cotton, rayon or other fibers, and fabrics thereof, which are not receptive to or do not retain the colorants used in these processes.

Heat transfer papers of various constructions have been used to record images by such toner-based techniques as laser printers or laser copiers and then to transfer the images to garments such as T-shirts. These papers are generally coated with a polymer layer which will fuse to the toner particles to provide the image in the usual manner. The polymer layer then can be transferred to a fabric, using heat and pressure, and the polymer carries the image as it melts and flows into the fabric. The paper then is removed while the polymer is still fluid.

Papers of the same basic construction described above have been devised to be receptive to other marking or printing methods. For example, U.S. Pat. No. 4,773,953 to Hare describes a heat transfer paper coated with Singapore Dammar gum which is receptive to thermal ribbon printers, the wax on the ribbons being compatible with the Dammar gum coating.

U.S. Pat. No. 5,242,739 to Kronzer and Parkkila describes an image-receptive heat transfer paper having a surface coating composed of polymer particles and a binder, both of which melt to a low viscosity between 65° C. and 180° C. Optionally, a second thermoplastic coating may be positioned beneath the printable coating to assist flow of the printed material into fabrics when the product is heated and pressed in the heat transfer operation. The polymer particles can have a particle size of from 2 to 50 micrometers and comprise from 85 to 20 percent by weight of the printable coating. The thickness of the image-receptive top coating is preferably in the range of 12 to 80 micrometers.

Although the above references disclose methods of decorating fabrics via digitally printed heat transfer papers, the imaging methods are restricted to thermal wax ribbon printing or electrostatic printing. Thermal wax ribbon printing is limited to narrow formats due to problems in handling wide ribbons of the very thin type needed in this application. Color printing resolution, at 400 dpi, is not sufficient to give photographic quality images, or even flexographic quality images. The cost per page is high due to the need to use three or four ribbon panels for each print. Electrostatic printing provides a better quality image but the printers are much more expensive and more costly to maintain.

The ink jet method of printing is a rapidly growing, commercially important printing process because of its ability to produce economical, high quality, multi-colored prints. Ink jet printing is becoming the method of choice for producing colored hard copies of computer generated images consisting of graphics and fonts in both narrow and wide formats.

In general, the ink used in ink jet printing consists of an aqueous solution of one or more dyes, a humectant, and a pH buffer. These formulations are desirable because of their low cost, availability, safety, and environmental friendliness. In an ink jet printer, ink is forced through a tiny nozzle (or a series of nozzles) to form droplets which are directed toward a printing substrate. The droplets may be electrostatically charged and attracted to an oppositely charged platen behind the substrate. By means of electrically controlled deflection plates, the trajectories of the droplets can be controlled to hit the desired spot on the printing substrate. Unused droplets are deflected away from the printing substrate into a reservoir for recycling. Drop on demand printing is used for smaller, desktop printers. Drops are created by heating or compressing the inks in capillary containers, thereby ejecting them onto the substrate as it passes over the print head. The printing substrate should allow for printing of round, well-shaped dots of high optical density. The substrate should control feathering (spreading) of the ink droplets and absorb the ink vehicle rapidly (fast dry time) while adsorbing the dye at the surface to give sharp, high-density p ints. Ideally, the substrate should also "fix" the dyes (i.e., cause them to become water insoluble), so as to cause the print to be moisture and water resistant. Practically, however, it is very difficult to obtain all the above properties in a single ink jet printing substrate.

There are a large number of references which relate to ink jet printable substrates. The typical substrate is a paper or other material having an ink-receptive coating. The coating typically includes one or move pigments and a binder. Pigments which have been used, alone or in combination, include, by way of illustration only, silica; clay; calcium carbonate; talc; barium sulfate; diatomaceous earth; titanium dioxide; cation-modified non-spherical colloidal silica, in which the modifying agent is aluminum oxide, hydrous zirconium oxide, or hydrous tin oxide; calcium carbonate-compounded silica; prismatic orthorhombic aragonite calcium carbonate; alumina; aluminum silicate; calcium silicate; kaolin; magnesium silicate; magnesium oxalate; magnesium-calcium carbonate; magnesium oxide; magnesium hydroxide; high-swelling montmorillonite clay; amorphous silica particles having a coating of a Group II metal; synthetic silica; and micro-powder silica. In some instances, the pigment may have certain defined requirements, such as particle diameter, oil absorption, surface area, water absorption, refractive index, and solubility in water.

Various binders have been employed to form the ink-receptive coating. Examples of such binders include, again by way of illustration only, a mixture of esterified starch and a water-insoluble cationic polymer; an epoxy resin and a thermoplastic resin; acrylic resins and other water-soluble polymers; a mixture of an alkylquaternaryammonium (meth)acrylate polymer; poly(vinyl alcohol); polyvinylpyrrolidone or vinylpyrrolidone-vinyl acetate copolymers or mixtures thereof; an amine salt of a carboxylated acrylic resin; oxidized or esterified starch; derivatized cellulose; casein; gelatin; soybean protein; styre e-maleic anhydride resin or derivatives thereof; styrene-butadiene latex; and poly(vinyl acetate).

Additional materials have been included in the ink-receptive layer, such as a cationic polymer. Moreover, two or more layers have been employed to form the ink-receptive coating.

An inherent weakness of ink jet printing is the lack of durability of the printed images, particularly when water-based inks are employed. The water-based inks dissolve or smear easily when the images get wet. Recent advances in ink jet printing technology have provided receptive coatings which contain cationic polymers and react with the anionic dyes to insolubilize them. However, the coatings are not very durable. Since they must be water swellable to accept and dry the water-based inks, they are not very water resistant and cannot be washed, or laundered, without damage.

Another possibility in water-based ink jet technology is to use insoluble pigments instead of dyes for coloration. Thus far, reliable pigment inks are not available. If they were, this would still not solve the problem of poor durability since the receptive coatings still must be water absorbent.

Still another technique—film lamination—has been used successfully to protect ink jet images. This consists of affixing a clear polymer film with an adhesive over the printed images. Needless to say, this adds considerably to the cost of producing a durable image. It is also not useful for images on clothes or fabrics since a heavy film coating on these materials would make them stiff and nonporous, thereby reducing the function of these materials for most applications.

Consequently, there is an opportunity for improved printing substrates which will permit by ink jet printing methods the formation of images thereon which are durable and washable.

SUMMARY OF THE INVENTION

The present invention addresses some of the difficulties and problems discussed above by providing a surprisingly simple means of creating washable and durable images with water-based inks on a wide variety of substrates. The present invention is based on a coating composition which includes from about 95 to about 50 percent by weight, based on the weight of the coating composition, of particles of a polymer having a solubility parameter of from about 19 to about 28 $(MPa)^{1/2}$ and particle sizes of from about 0.5 to about 50 micrometers. For example, the polymer may have a solubility parameter of from about 22 to about 28 $(MPa)^{1/2}$. As another example, the particles of polymer may have particle sizes of from about 2 to about 15 micrometers.

The coating composition also includes from about 5 to about 50 percent by weight, based on the weight of the coating composition, of a binder. The binder may be essentially any polymer which can be dispersed or dissolved in the coating vehicle or solvent. Convenient binders are polymeric lattices such as poly(vinyl acetate), acrylic and methacrylate lattices, amine-dispersed carboxylated polymers such as polyesters and ethylene-acrylic acid lattices, and the like.

The coating composition also may include a surfactant. For example, the surfactant may be anionic or nonionic. Other ingredients also may be present. Examples of such other ingredients include, by way of illustration only, crosslinking agents, viscosity modifiers, and defoamers.

In addition to the coating composition, the present invention also provides a substrate having a coating thereon, which coating includes from about 95 to about 50 percent by weight, based on the weight of the coating composition, of particles of a polymer as described above and from about 5 to about 50 percent by weight, based on the weight of the coating composition, of a binder as described above. Examples of suitable substrates include, by way of example, only, fibers; fabrics, which may be woven or nonwoven; films; and papers.

The present invention additionally provides a method of preparing a durable and washable ink jet printed image on a substrate, which method includes providing a substrate having a coating prepared from the coating composition already described, printing an image on the coated substrate with an ink jet printer; and thermally fusing the ink jet printed image to the coated substrate.

DETAILED DESCRIPTION OF THE INVENTION

As used herein, the term "printed image" is meant to include an image placed on a substrate by any means, such as by direct and offset gravure printers, silk-screening, typewriters, laser printers, dot-matrix printers, and ink-jet printers, by way of illustration. Moreover, the image composition can be any of the inks or other compositions typically used in printing processes.

The term "ink-jet printing" and variations thereof refers to the formation of an image on a substrate, e.g., paper, by means of an ink-jet printer.

The term "melt flow index" is used herein to mean a melt flow rate as determined in accordance with ASTM Method D 1238-82, Standard Test Method for Flow Rates of Thermoplastics by Extrusion Plastometer, using a Model VE 4-78 Extrusion Plastometer (Tinius Olsen Testing Machine Company, Willow Grove, Pa.) having an orifice diameter of 2.0955±0.0051 mm; unless specified otherwise, test conditions were at a temperature of 190° C. and a load of 2.16 kg.

As already stated, the present invention provides a coating composition which includes from about 95 to about 50 percent by weight, based on the weight of the coating composition, of particles of a polymer having a solubility parameter of from about 19 to about 28 $(MPa)^{1/2}$ and particle sizes of from about 0.5 to about 50 micrometers. For example, the polymer may have a solubility parameter of from about 22 to about 28 $(MPa)^{1/2}$. As another example, the particles of polymer may have particle sizes of from about 2 to about 15 micrometers.

The coating composition also includes from about 5 to about 50 percent by weight, based on the weight of the coating composition, of a binder. The binder may be essentially any polymer which can be dispersed or dissolved in the coating vehicle or solvent. Convenient binders are polymeric lattices such as poly(vinyl acetate), acrylic and methacrylic lattices, amine-dispersed carboxylated polymers such as polyesters and ethylene-acrylic acid lattices, and the like.

The coating composition also may include a surfactant. The surfactant may be an anionic, a nonionic, or a cationic surfactant. Desirably, the surfactant will be a nonionic or anionic surfactant. Examples of anionic surfactants include, among others, linear and branched-chain sodium alkylbenzenesulfonates, linear and branched-chain alkyl sulfates, and linear and branched-chain alkyl ethoxy sulfates. Cationic surfactants include, by way of illustration, tallow trimethylammonium chloride. Examples of nonionic surfactants, include, again by way of illustration only, alkyl polyethoxylates, polyethoxylated alkylphenols, fatty acid ethanol amides, complex polymers of ethylene oxide, propylene oxide, and alcohols, and polysiloxane polyethers. More desirably, the surfactant will be a nonionic surfactant.

Other ingredients also may be present. Examples of such other ingredients include, by way of illustration only, crosslinking agents, viscosity modifiers, and defoamers.

In addition to the coating composition, the present invention also provides a substrate having a coating thereon, which coating includes from about 95 to about 50 percent by weight, based on the weight of the coating composition, of particles of a polymer as described above and from about 5 to about 50 percent by weight, based on the weight of the coating composition, of a binder as described above. Examples of suitable substrates include, by way of example, only, fibers; fabrics, which may be woven or nonwoven; films; and papers.

When the substrate is intended to be used as a heat-transfer material, the binder desirably will have a melting point of from about 65 to about 180 degrees Celsius. The term "melts" and variations thereof are used herein only in a qualitative sense and are not meant to refer to any particular test procedure. Reference herein to a melting temperature or range is meant only to indicate an approximate temperature or range at which a binder melts and flows under the conditions of a melt-transfer process to result in a substantially continuous film.

Manufacturers' published data regarding the melt behavior of polymers or binders correlate with the melting requirements described herein. It should be noted, however, that either a true melting point or a softening point may be given, depending on the nature of the material.

Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined by ASTM E-28, is useful in predicting their behavior in the present invention.

The present invention additionally provides a method of preparing a durable and washable image printed on a substrate with water-based inks, which method includes providing a substrate having a coating prepared from the coating composition already described, printing an image on the coated substrate with a water-based ink, e.g., by ink jet printer; and thermally fusing the printed image to the coated substrate.

In one embodiment of the present invention, a coating is applied directly to a substrate. After printing, the material is heated with pressure to fuse the coating. Quite surprisingly, coatings of the proper construction absorb and dissolve the ink jet dyes, which then become insolubilized and protected within the fused polymer mass of the coating. Also, surprisingly, these polymeric coatings, composed of polymer particles and a polymeric binder, are capable of absorbing water-based inks, even though films of the same polymers may be water repellent or impervious to water.

The substrates for the coating composition may be essentially anything. For example, films, papers, and yarns have been successfully coated, printed with an ink jet printer, and heated with pressure to give a durable, water-resistant image or color on the substrate. Since yarns can be treated in this manner, fabrics made of the yarns would be expected to be treatable in the same manner and, of course, fabrics can be fashioned from the treated yarns as well.

The coating composition consists primarily of particles of a polymer having a solubility parameter of from about 19 to about 28 $(MPa)^{1/2}$ and particle sizes of from about 0.5 to about 50 micrometers. The polymer particles constitute from about 95 to about 50 percent by weight of the coating, the remainder being a binder which holds the coating together and provides temporary adhesion to the substrate. The coating composition adheres much more strongly after fusion.

The binder may be essentially any polymer which can be dispersed or dissolved in the coating vehicle or solvent. Convenient binders are polymeric lattices such as poly(vinyl acetate), acrylic and methacrylic lattices, amine-dispersed carboxylated polymers such as polyesters and ethylene-acrylic acid lattices, and the like. It is desirable to use a binder which has good compatibility with the polymer particles, so that the fused polymeric mass in the finished product is not hazy or weakened by poor or incomplete interaction of the two phases. Also, one would not choose a water-soluble binder for a water resistant application, nor would one choose a low melting point binder for a heat-resistant application. The binder constitutes from about 5 to about 50 percent by weight of the coating composition.

If desired, a third component may be present. This third ingredient is a dispersant or surfactant, which usually will be required to obtain a uniform separation of the polymer particles in the vehicle or solvent. For example, nonionic surfactants such as Triton X-100 or anionic surfactants such as Tamol 731 have been found to be effective for dispersing the Orgasol nylon type polymers in water. A dispersant may not be required at all if one uses a latex already containing surfactant, or if one uses an organic solvent vehicle instead of water. Of course, other ingredients such as crosslinking agents, viscosity modifiers, defoamers, and the like may be included, if desired.

Almost any coating method should be applicable for applying the coating, depending mainly on the substrate one wishes to coat. For example, meyer rod or air knife coating methods are useful for paper or film, while yarns or fabrics may be coated by dipping in a bath of the coating composition, squeezing excess coating out with a wringer or nip, then drying. Any drying method may be employed, but care must be taken not to fuse the coating to any extent, since this will result in poor ink drying or ink feathering. After printing or coloration of the substrate, it is heated above the fusing temperature of the polymer particles, preferably with pressure, to provide the durable image. The exact time, temperature, and pressure needed will, of course, depend on the particular substrate and on the polymer fusion temperature. For example, fused coatings using a Hicks S-600 fabric transfer press at 177° C. for a few seconds have been obtained. Note that the particles are not required to flow to any great extent in this operation, so that polymers which have a very low melt flow index, or even polymers which crosslink with heat, may be employed. However, if it is to be used as a heat transfer coating for decorating fabrics, the particles should have a melt flow index of at least 10 g/10 minutes.

When used as an image receptive coating for heat transfer paper, the polymer particles in the coating must be capable of melting and flowing into the fabric from the transfer paper, as described in U.S. Pat. No. 5,242,739. The present coating also requires the polymer particles to have a solubility parameter of from about 19 to about 28 $(MPa)^{1/2}$ to dissolve the ink dyes upon fusion. Also, the present coating will contain from about 5 to about 50 percent binder in order to maintain absorbency. A binder level of from about 10 to about 25 percent is desirable. Although the low binder levels generally do not result in a very strong or abrasion resistant coating, ink jet printing or water-based marking procedures do not impose much mechanical stress on the substrates. The coating becomes much stronger after fusion.

When used as an image-receptive coating for heat transfer fabric decoration, the composition of the present invention may be applied to a polymer-coated paper, such as a bond or label base paper coated with an ethylene-vinyl acetate or ethylene-methacrylic acid resin, as the surface layer. After printing, the printed image then can be applied to fabrics, garments, and the like, as described in U.S. Pat. No. 4,773,953. However, in the present invention, the paper can be imaged with an ordinary ink jet color printer using water-soluble ink dyes and the resulting image becomes permanently fixed to the fabric during the heat transfer process. The dyes do not wash out to any great extent even after six or more cold water washes.

Papers designed for typical heat transfer applications generally work well and no particular requirements for such papers are imposed by the coating composition of the present invention.

The present invention is further described by the examples which follow. Such examples, however, are not to be construed as limiting in any way either the spirit or the scope of the present invention. The examples illustrate use of the coating in fabricating a durable ink jet image on paper and on film, a heat transfer paper, and a dye receptive yarn which retains dyes after heating and fusing the dyed yarn. By inference, it is believed that a fabric would behave similar to the yarn, so the coating could be used for fabrics as well as for yarns.

EXAMPLE 1

Durable Label Printing

A label paper (James River EDP label, having a basis weight of 90 grams per square meter or gsm) was coated on both sides with a 100:50 ratio of Rhoplex® HA-16 (a hard polyacrylate from Rohm and Haas Company) and clay, to a dry coating weight of about 10 gsm on each side. One side was overcoated with a mixture of 100 dry parts Dow plastic pigment 244 (50 percent solids dispersion of polystyrene particles having a solubility parameter of about 19 $(MPa)^{1/2}$), and 10 dry parts of Michelman 58035 (a 35 percent solids ethylene-acrylic acid dispersion) as binder. A number 10 meyer rod was used. After drying at 85° C., the sample was printed with a colored test pattern on a Hewlett Packard Desk Jet Printer. The ink dried quickly and did not feather. The printed paper was then fused with the face side against a silicone release paper in a Hicks S-600 fabric transfer press at 177° C. for 15 seconds. The image became glossy and did not wash out when dipped into water.

EXAMPLE 2

A latex-saturated label base paper was used as the substrate. The saturant was Rhoplex® B-15 (a polyacrylate from Rohm and Haas Company) and the add-on was 18 parts per 100 parts of fiber on a dry weight basis. The coating in this case was a mixture of 100 parts of Orgasol® 3501 EX D NAT 1 (an 8-micron average particle size copolymer of nylon 6 and nylon 12, having a melting point of 160° C., available from Elf Atochem, France), 25 parts Michem® Prime 4983 binder, 5 parts Triton® X-100 dispersant, and one dry part Methocel A-15 (a methylcellulose thickener from Dow Chemical Company, Midland, Mich.). In order to disperse the orgasol particles, water was added to the mixture in an amount equal to 3.3 times the amount of Orgasol and the resulting mixture was passed through a colloid mill (Tri-Homo Division of Sonic Corporation, Stratford, Conn.) at a setting of two mils.

The coating was applied to the latex-saturated label base using a number 20 meyer rod and then dried at 85° C. in a forced air oven to give a dried coating weight of 12 gsm. The sample was printed with a colored test print using a Canon BJ 600 printer, then fused in the heat press, as before, against release paper for 15 sec at 177° C. Again, a glossy, water resistant image was obtained.

EXAMPLE 3

Coated Yarn

A sample of rayon yarn (type 152/55 from Robinson-Anton Textile Corporation, Fairfield, N.J.) was dipped in a bath of the coating composition of Example 2. The dipped yarn was passed through a laboratory wet press having a steel bottom roll and a rubber top roll to remove excess coating composition, then dried with an electric hair drier as it was wound onto a spool. The add-on was about 10 parts of coating composition per 100 parts of yarn. A yarn sample and a control (a sample of yarn which had not been dipped into the coating composition) then were colored with a purple water-based, washable marker (Crayola washable marker). Each yarn sample then was heat pressed as above for 30 seconds at 66° C. All of the purple dye washed out of the control when it was dipped in water. Only a small amount came out of the control which retained a dark purple color after soaking in water for several days.

EXAMPLE 4

The coating of Example 2 was applied to a substrate and treated as in Example 1, but in this case the substrate was a polyester film of the type used for making laser prints in a photocopier. The results were similar to those in Example 1.

EXAMPLES 5–7

These examples illustrate the use of the coating of Example 2 as a print coating for a heat transfer paper. The substrate was a label paper (Repap® 9365 having a basis weight of 90 gsm, available from Repap Sales Corporation, Appleton, Wis.) which was extrusion coated on the backside with 1.8 mils (about 0.05 mm) of Nucrel® 599 (an ethylene-methacrylic acid copolymer from DuPont having a melt flow index of 500).

The binder employed was Michem® Prime 4983 (Michelman, Inc., Cincinnati, Ohio). The binder is a 25 percent solids dispersion of Primacor® 5983 made by Dow Chemical Company. The polymer contains 20 percent acrylic acid and 80 percent ethylene. The copolymer had a Vicat softening point of 43° C. and a ring and ball softening point of 100° C. The melt index of the copolymer was 500 g/10 minutes. The polymer particles were the Orgasol® 3501 particles described in Example 2.

Two different thickeners (Methocel A15 and Acrysol ASE 75) were used in the formulations. A number 20 meyer rod was used to apply the coatings, which were then dried at 85° C. The coating weight was 12 gsm. After printing with a Canon BJ 600 printer, samples were transferred to 100 percent cotton T-shirts using a Hicks S600 hot press for 20 seconds at 177° C. The coating compositions of the examples are summarized in Table 1.

TABLE 1

Summary of Coatings for Examples 5–7

| % | | Example 5 | | Example 6 | | Example 7 | |
|---|---|---|---|---|---|---|---|
| Component | Solids | Dry | Wet | Dry | Wet | Dry | Wet |
| Polymer[a] | 30 | 100 | 333 | 100 | 333 | 100 | 333 |
| Binder[b] | 25 | 25 | 100 | 25 | 100 | 25 | 100 |
| Methocel[c] | 5 | 1 | 20 | 2 | 40 | — | — |
| Acrysol[d] | 40 | — | — | — | — | 2 | 5 |
| Water | — | — | — | — | — | — | 20 |
| KOH[e] | 5 | — | — | — | — | 1 | 20 |
| Totals[f] | — | 126 | 453 | 127 | 473 | 128 | 478 |

[a]Orgasol ® 3501 EX D NAT 1.
[b]Michem ® Prime 4983
[c]Methocel ® A15.
[d]Acrysol ® ASE 75.
[e]Potassium hydroxide, added to activate the thickener.
[f]The percent solids were 27.8, 26.8, and 26.8 percent, respectively.

The thickener employed did not appear to have a significant effect on the quality or durability of the printed image. After six cold water washings, the magenta color lightened somewhat. The other colors lightened very little.

EXAMPLES 8–12

The procedure of Examples 5–7 was repeated in order to compare four different binders, one of which was the binder employed in those previous examples (Michem® Prime 4983). The other three binders were Michem® 58035, Michem® Prime 4490, and Airflex® 140. Each coating composition also contained a viscosity modifier, Polyox® N60K, a poly(ethylene oxide) dissolved in water at 5 percent solids.

Michem® 58035 was a 35 percent solids dispersion of Allied Chemical's AC 580, which was approximately 10 percent acrylic acid and 90 percent ethylene. The polymer reportedly has a softening point of 102° C. and a Brookfield viscosity of 0.65 Pa s (650 centipoise) at 140° C. It is available from Michelman, Inc.

Michem® Prime 4490 was a 40 percent solids, ethylene-acrylic acid copolymer dispersion from Michelman, Inc.

Airflex® 140 was a poly(vinyl alcohol)-stabilized ethylene-vinyl acetate copolymer. The material is available from Air Products and Chemicals, Inc., Allentown, Pa. Two different levels of this binder were studied.

The coating compositions of Examples 8–12 are summarized in Tables 2 and 3.

TABLE 2

Summary of Coatings for Examples 8–10

| % | | Example 8 | | Example 9 | | Example 10 | |
|---|---|---|---|---|---|---|---|
| Component | Solids | Dry | Wet | Dry | Wet | Dry | Wet |
| Orgasol[a] | 30 | 100 | 333 | 100 | 333 | 100 | 333 |
| Polyox[b] | 5 | 1.5 | 30 | 1.5 | 30 | 1.5 | 30 |
| 58035[c] | 35 | 25 | 71 | — | — | — | — |
| 4983[d] | 25 | — | — | 25 | 100 | — | — |
| 4490[e] | 40 | — | — | — | — | 25 | 62 |
| Totals[f] | — | 126 | 434 | 126 | 463 | 126 | 426 |

[a]Polymer particles, Orgasol ® 3501 EX D NAT 1.
[b]Viscosity modifier, Polyox ® N60K.
[c]Binder, Michem ® 58035.
[d]Binder, Michem ® Prime 4983.
[e]Binder, Michem ® 4490.
[f]The percent solids were 29.2, 27.3, and 29.7 percent, respectively.

TABLE 3

Summary of Coatings for Examples 11 and 12

| % | | Example 11 | | Example 11 | |
|---|---|---|---|---|---|
| Component | Solids | Dry | Wet | Dry | Wet |
| Orgasol[a] | 30 | 100 | 333 | 100 | 333 |
| Polyox[b] | 5 | 1.5 | 30 | 1.5 | 30 |
| 140[c] | 55 | 16 | 30 | 33 | 60 |
| Totals[d] | — | 118 | 393 | 134 | 423 |

[a]Polymer particles, Orgasol ® 3501 EX D NAT 1.
[b]Viscosity modifier, Polyox ® N60K.
[c]Binder, Airflex ® 140.
[d]The percent solids were 30 and 31.8 percent, respectively.

These binders gave coatings which were ink jet printed with the BJ 600 printer and transferred to cotton T-shirts successfully. Wash tests were good as well. However, in another application of the coating, i.e., marking with Crayola® water-based marking pens, they didn't perform as well. When coatings having these binders were dried at 85° C., they lacked the needed water resistance to remain intact when the paper was colored with Crayola® water-based markers. The coatings of Examples 8 and 10 in Table 2 (Michem® 58043 and Michem® 4490 binders) could be used both for ink jet printing and the Crayola® markers after reheating the samples for 30 seconds at 100° C. The coating of Example 9 worked well for both uses after just drying at 85° C, while the coatings of Examples 11 and 12 required re-heating for 30 seconds at 120° C. After the 120° C. reheating, inks from the Canon BJ 600 printer dried too slowly and feathered, indicating that the coating had begun to fuse and become less absorbent. This was true at both binder levels tried (33 and 16.5 parts). It is believed that Michem® Prime 4983 binder gave the best results because it developed water resistance more rapidly upon being dried, possibly because it was free of surfactants and had a low film formation temperature.

EXAMPLE 13

The base sheet of Example 1 was used in this example, along with the same precoatings on both sides (Clay slurry and Rhoplex® HA-16). Instead of an extrusion coating, however, a water dispersion of Microthene® FE532 (100 dry parts) and Michem® 58035 (50 dry parts) was used. Three dry parts of Triton X-100 was used to disperse the FE532 (an ethylene-vinyl acetate copolymer having a melt index of 20 from Quantum Chemical Company); 100 g of water was added for each g of FE532, and the coating was dispersed at a 2 mil setting on a colloid mill (Tri-Homo Division of Sonic Corporation, Stratford, Conn.). A number 20 meyer rod was used to apply the coating which was then dried at 105° C. The drying fused the coating and it became glossy. The coating of Example 2 then was applied, dried, printed, transferred, and washed as in Example 4. The results were nearly as good, but the transferred image was quite glossy and slightly more ink washed out after six washes.

Microthene® FE 532 is an ethylene-vinyl acetate co-polymer supplied by USI Chemicals Co., Cincinnati, Ohio. The particle size is reported to average approximately 20 micrometers. The Vicat softening point is 75° C. The melt flow rate of the copolymer is 9 g/10 minutes and it is reported to have a density of 0.928 g/cm$^3$.

EXAMPLE 14

The procedure of Example 4 was repeated, except that Orgasol 2001 UD NAT 2, a nylon 12 powder having a melting point of 175° C.–174° C., and an average particle size of 5 micrometers, was used instead of Orgasol® 3501 EX D NAT 1. The printing and transfer were done in the same manner. The paper was a little harder to remove from the T-shirt and the transferred image was a little darker.

EXAMPLES 15–17

The coating compositions summarized in Table 4 were applied to the extrusion-coated paper of Example 2, printed with a Canon BJ 600 printer with a colored test pattern, then transferred to a cotton T-shirt and washed and dried as before. The coating compositions are summarized in Table 4. Reten® 204LS is a cationic polymer, an amide-epichlorohydrin copolymer supplied by Hercules Inc., Wilmington, Del. Finally, MPP 635G is a high-density polyethylene wax supplied by Micro Powders, Inc. The average particle size of the polymer was 5 micrometers, the melting point was reported to be 124, and the melt flow rate was "high."

TABLE 4

Summary of coatings for Examples 15 and 16

| Component | % Solids | Example 15 Dry | Example 15 Wet | Example 16 Dry | Example 16 Wet | Example 17 Dry | Example 17 Wet |
|---|---|---|---|---|---|---|---|
| MPP635G[a] | 40 | 100 | 250 | — | — | 100 | 333 |
| Orgasol[b] | 30 | — | — | 100 | 333 | — | — |
| 140[c] | 55 | 16 | 30 | 33 | 60 | 16 | 30 |
| Reten[d] | 14 | 16 | 120 | 16 | 120 | — | — |
| Polyox[e] | 5 | 0.5 | 10 | 0.5 | 10 | 0.5 | 10 |
| Totals[f] | — | 133 | 410 | 133 | 493 | 116 | 290 |

[a]Polymer particles, MPP635G.
[b]Polymer particles, Orgasol® 3501 EX D NAT 1.
[c]Binder, Airflex® 140.
[d]Cationic polymer, Reten® 204LS.
[e]Viscosity modifier, Polyox® N60K.
[f]The percent solids were 32.4, 27, and 34.8 percent, respectively.

Note that the coating of Example 15 of Table 4 contained a polyethylene powder having a solubility parameter of about 16 (MPa)$^{1/2}$. The coating of Example 15 printed satisfactorily, but required about 2 minutes to dry. The MPP 635G powder had an average particle size of about 12 micrometers but consisted of solid particles. The Orgasols were somewhat porous and less dense. This may account for the slower drying of the coating of Example 15. The coatings of both examples transferred well, but yellowed the cotton T-shirt slightly. Color retention after 6 washings was fair for the coating of Example 15 and excellent (identical to that of Example 4) for the coating of Example 16. Note that both of these coatings contained a cationic polymer. When the cationic polymer was not included (Example 17), most of the transferred image washed out after just three washings, while, as noted in the previous examples, no cationic polymer was needed when more polar polymers (i.e., polymers having a solubility parameter of from about 19 to about 28 (MPa)$^{1/2}$) were used.

While the specification has been described in detail with respect to specific embodiments thereof, it will be appreciated that those skilled in the art, upon attaining an understanding of the foregoing, may readily conceive of alterations to, variations of, and equivalents to these embodiments.

What is claimed is:

1. A method of preparing a washable and durable image on a substrate from water-based inks, which method comprises:

providing a substrate having a coating comprising
      from about 95 to about 50 percent by weight, based on the weight of the coating composition, of particles of a polymer having a solubility parameter of from about 19 to about 28 (MPa)$^{1/2}$ and particle sizes of from about 0.5 to about 50 micrometers; and
      from about 5 to about 50 percent by weight, based on the weight of the coating composition, of a binder;

printing an image on the coated substrate with an ink jet printer; and thermally fusing the ink jet printed image to the coated substrate.

2. The method of claim 1, in which the coating composition further comprises a surfactant.

3. The method of claim 2, in which the surfactant is nonionic.

4. The method of claim 1, in which the polymer has a solubility parameter of from about 22 to about 28 (MPa)$^{1/2}$.

5. The method of claim 1, in which the particles of polymer have particle sizes of from about 2 to about 15 micrometers.

6. The method of claim 1, in which the substrate is a fiber.

7. The method of claim 1, in which the substrate is a fabric.

8. The method of claim 7, in which the fabric is a nonwoven web.

9. The method of claim 1, in which the substrate is a paper.

* * * * *